(12) United States Patent
Ashcraft et al.

(10) Patent No.: US 8,949,581 B1
(45) Date of Patent: Feb. 3, 2015

(54) THRESHOLD CONTROLLED LIMITED OUT OF ORDER LOAD EXECUTION

(75) Inventors: Matthew W. Ashcraft, Belmont, CA (US); John Gregory Favor, Scotts Valley, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 907 days.

(21) Appl. No.: 13/103,833

(22) Filed: May 9, 2011

(51) Int. Cl.
*G06F 15/00* (2006.01)
*G06F 9/30* (2006.01)
*G06F 9/40* (2006.01)

(52) U.S. Cl.
USPC .......................................... 712/214

(58) Field of Classification Search
None
See application file for complete search history.

(56) References Cited

U.S. PATENT DOCUMENTS

| 5,553,255 A | * | 9/1996 | Jain et al. ....................... 712/235 |
| 5,751,983 A | * | 5/1998 | Abramson et al. ............. 712/216 |
| 6,725,358 B1 | * | 4/2004 | Moore ........................... 712/216 |
| 2008/0010441 A1 | * | 1/2008 | Altman et al. ................. 712/225 |
| 2009/0106499 A1 | * | 4/2009 | Aoki et al. ..................... 711/137 |

* cited by examiner

*Primary Examiner* — George Giroux
(74) *Attorney, Agent, or Firm* — Amin, Turocy & Watson, LLP

(57) ABSTRACT

A load scheduler capable of limited issuing of out of order load instruction is disclosed. The load scheduler uses a max skipping threshold which limits the number of skipping load instructions and a max skipped threshold which limits the number of skipped load instructions. An address tag for a skipping instruction is stored in a skipping load instruction tracking unit when a skipping load instruction is issued. When a skipped load instruction issues, the address tag of the skipped load instruction is compared to the address tag of the skipping instruction to determine if a hazard from the out of order issuing of the skipping load instruction caused a hazard and must be flushed.

40 Claims, 15 Drawing Sheets

THRESHOLD CONTROLLED LIMITED OUT OF ORDER LOAD EXECUTION

BACKGROUND

1. Background Field

The present invention relates to processing units and in particular to load schedulers.

2. Relevant Background

Processors, such as microprocessors, digital signal processors, and microcontrollers, are generally divided into many sub-systems, such as a memory system, a processing unit, and load store units. The load store unit transfer data between the processing units and the memory system. Specifically, the load store unit reads (i.e. loads) data from the memory system and writes (i.e. stores) data to the memory system.

FIG. 1 shows a simplified block diagram of a load store unit 110 coupled to a memory system 140. Load store unit 110 includes an instruction decoder 111, a load scheduler 113, a load pipeline 115, a store scheduler 117, and a store pipeline 119. In some processors, instruction decoder 111 may be part of another subsystem. Instruction decoder 111 decodes the program instructions and sends load instructions to load scheduler 113 and store instruction to store scheduler 117. Other types of instructions are sent to appropriate execution units, such as a floating point execution unit, or an integer execution unit. In most systems with multiple processing units, each processing unit includes a separate load/store unit.

Load scheduler 113 schedules the load instructions and issue load instructions to load pipeline 115 for execution. Load pipeline 115 executes the load instructions and reads the requested data from memory system 140. Similarly, store scheduler 117 schedules the store instructions and issues store instruction to store pipeline 119 for execution. Store pipeline 119 executes the store instruction and stores the data from the store instructions into memory system 140.

While the simplest way to issues load instructions is to issues the load instructions in order, greater performance may be achieved by issuing load instructions out of order. For example, if load scheduler 113 receives load instruction L__1, followed by load instruction L__2, followed by load instruction L__3 and load instruction L__1 has unresolved dependencies, load scheduler 113 may issue load instruction L__2 prior to load instruction L__1 rather than stalling and waiting for the dependencies of load instruction L__1 to resolve. Furthermore, load scheduler 113 may also issue load instruction L__3 while waiting for the dependencies of load instruction L__1 to resolve. However, various hazards may occur when load instructions are issued out of order. For example, if load instruction L__1 and load instruction L__2 (which should come after load instruction L__1) are to the same memory location, load instruction L__2 is issued before load instruction L__1, and a store instruction modifies the memory location after execution of load instruction L__2 and before the execution of load instruction L__1, then the data retrieved by load instruction L__1 and load instruction L__2 may be inaccurate. Issuing load instructions out of order is particularly complicated in systems having multiple processing units because store instructions from different processing units may change the data required by the load instructions. Typically, load store units that support out of order execution of load instructions require an extensive tracking system to monitor all loads and store instruction to detect hazards caused by instructions that were issued out of order. The out of order instructions that have hazards are then flushed and reissued to eliminate the hazards. To support unlimited issuing of out of order load instructions, the tracking systems would require extensive overhead. The overhead for the tracking system may negate the performance benefits of issuing out of order load instructions.

Hence there is a need for a method and system to support issuing of out of order load instructions while detecting and resolving any hazards caused by the out of order load instructions without using extensive resources.

SUMMARY

Accordingly, the present invention provides load schedulers that support limited issuing of out order load instructions and an efficient skipping load instruction tracking unit to detect and resolves hazards that may have resulted from issuing out of order load instructions. Limited issuing of out of order load instructions is easier to track but provides most of the benefits of fully unlimited issuing of out of order load instructions. Embodiments of the present invention can be used with systems having multiple processing units as well as single core processors. Specifically, in one embodiment of the present invention limited issuing of out of order instructions is controlled by a max skipping threshold that limits the maximum number of "skipping load instructions" and a max skipped threshold which limit the maximum number of "skipped load instructions". "Skipping load instruction" refers to a load instruction that is issued ahead of an older load instruction, (i.e. one that was received before the skipping load instruction). Conversely, "skipped load instruction" refers to an instruction that was "skipped" so that a load instruction that is younger (i.e. received later) than the skipped load instruction to be issued ahead of the skipped load instruction.

When a skipping load instruction, such as a second oldest load instruction, is issued before a first oldest load instruction, i.e. the skipped load instruction, a second oldest load address tag for the second oldest load instruction is stored in an entry of a skipping load instruction tracking unit and setting a valid flag for the entry of the skipping load instruction tracking unit. If a store instruction is executed that has a store address tag that matches the second oldest load address tag a write flag for the entry corresponding to the second oldest load instruction is set to a valid state. When the oldest load instruction is issued, a first oldest load address tag is compared to valid entries of the skipping load instruction tracking unit. If the first oldest address tag matches the second oldest address tag and the write flag of the entry corresponding to the second oldest load instruction is set then a hazard exists for the second oldest load instruction. Accordingly, the second oldest load instruction is flushed.

The present invention will be more fully understood in view of the following description and drawings.

DETAILED DESCRIPTION

As explained above, load schedulers that support issuing unlimited out of order load instructions require extensive tracking systems to detect and resolve hazards. However, in accordance with the present invention a novel load scheduler supports limited issuing of out of order load instruction which provides most of the benefit of unlimited issuing of out of order load instructions but requires less tracking overhead for hazards. Furthermore, the present invention can be used in systems having multiple processing units as well as single core processors.

Figure 2:
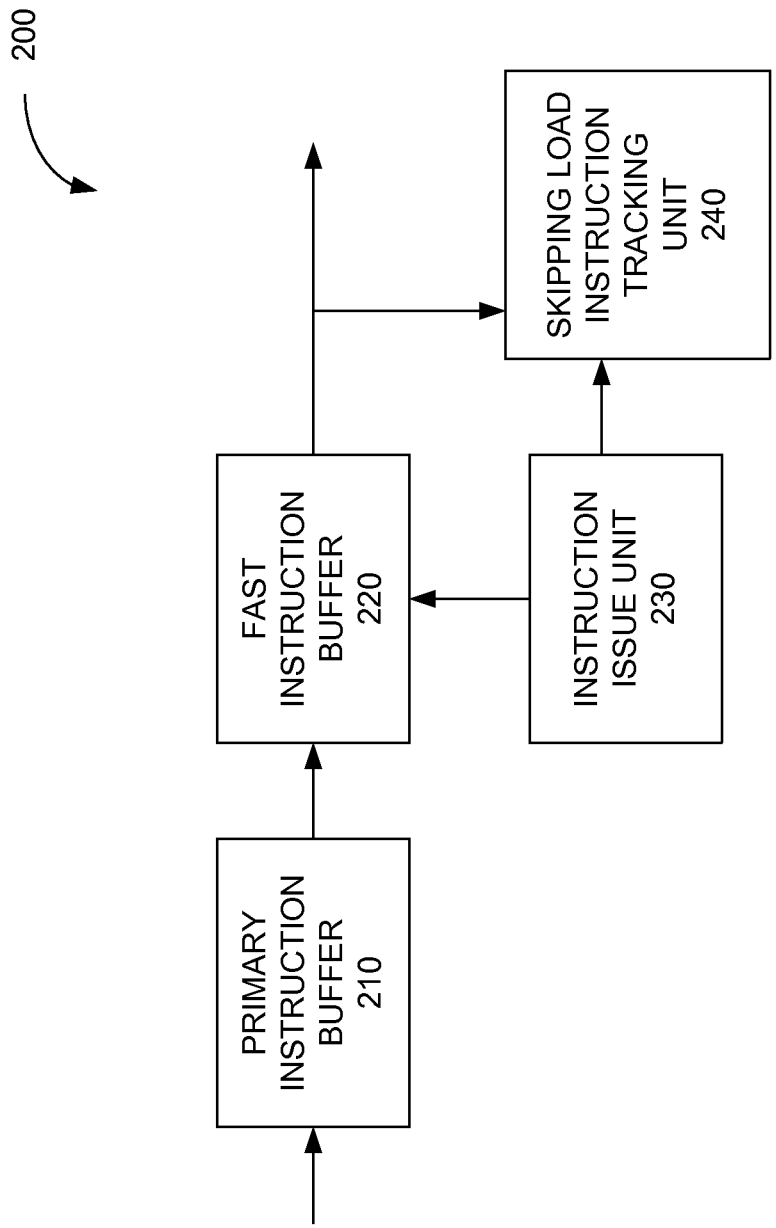
FIG. 2 is a simplified block diagram of a load scheduler in accordance with one embodiment of the present invention.

FIG. 2 shows a simplified block diagram of load scheduler 200 in accordance with one embodiment of the present invention. Load scheduler 200 includes a primary instruction buffer 210, a fast instruction buffer 220, an instruction issue unit 230 and a skipping load instruction tracking unit 240. For clarity the term "skipping load instruction" refers to a load instruction that is issued ahead of an older load instruction, i.e. an instruction that was received before the skipping load instruction. Conversely, the term "skipped load instruction" refers to an instruction that was "skipped" so that a load instruction that is younger (i.e. received later) than the skipped load instruction was issued ahead of the skipped load instruction. A skipping load instruction remains a "skipping load instruction" until the instruction (or instructions) skipped by the skipping load instruction has issued and no hazards are detected. Similarly, a skipped load instruction remains a skipped load instruction until the skipped load instruction issues and no hazards are detected. For example, a load scheduler receives load instruction L__1, followed by load instruction L__2, followed by load instruction L__3. Thus, load instruction L__1 is the oldest load instruction, load instruction L__2 is the second oldest load instruction, and load instruction L__3 is the third oldest load instruction. The load scheduler issues load instruction L2 followed by load instruction L__3. However, load instruction L__1 has unresolved dependencies and is stalled. Because load instructions L__2 and L__3 skipped over load instruction L__1, i.e. issued before load instruction L__1, load instruction L__1 can be referred to as a skipped load instruction and load instruction L__2 and load instruction L__3 can both be referred to as skipping load instructions. However once load instruction L__1 issues and if no hazards are detected, then load instructions L__1 no longer need to be considered a skipped load instructions and load instructions L__2 and L__3 no longer need to be considered skipping load instructions.

Figure 1:
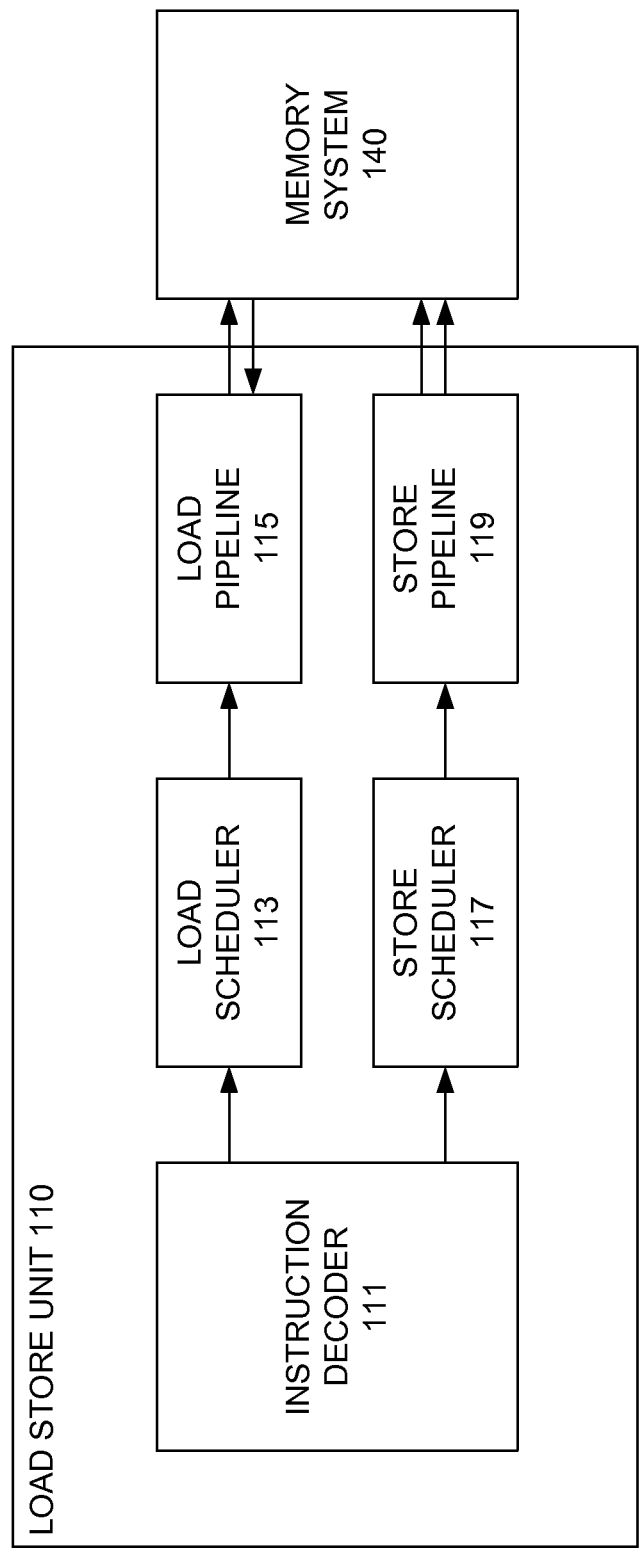
FIG. 1 is a simplified block diagram of a load store unit.

Primary instruction buffer 210 receives load instructions from an instruction decoder (see FIG. 1). Generally, primary instruction buffer 210 is organized as a FIFO (First-In-First-Out) buffer. Because, a large number of load instructions may be stored in primary instruction buffer 210, in most embodiments of the present invention, primary instruction buffer 210 is constructed using higher density memory rather than registers. The oldest (i.e. earliest received) instructions are transferred from primary instruction buffer 210 to fast instruction buffer 220 as space becomes available in fast instruction buffer 220. Fast instruction buffer 220 is generally constructed using fast memory cells such as registers to minimize latency between the load scheduler and the load pipeline. Instruction issue unit 230 determines which instruction in fast instruction buffer 220 to issue to the load pipeline (See FIG. 1) as described below and shown in FIGS. 4A-4H and 5. Skipping load instruction tracking unit 240, stores information about skipping load instructions and is used to detect hazard that may be caused by the out of order load instructions. Specifically, skipping load instruction tracking unit 240 includes multiple entries (See FIG. 3 and FIG. 6). Each entry includes include a tag field, a valid flag, and a write flag. When instruction issue unit 230 issues a skipping load instruction the valid flag of an entry of skipping load instruction tracking unit 240 is set and an address tag for the skipping load instruction is stored in the tag field of the entry. When store instructions are executed the valid entries of the skipping load instruction tracking unit are checked for address tags that match the address tag of the store instruction. If a match is found the write flag of the entry in skipping load instruction tracking unit 240 is set. When a skipped load instruction issues, the valid entries of the skipping load instruction tracking unit are checked for address tags that match the tag of the skipped load instruction. A hazard is detected if a match is found and the write flag is set. When hazards are found the skipping load instruction that corresponds to the entry of skipping load instruction tracking unit 240 is flushed from the load pipeline and must be reissued. In systems with multiple processing units, store instructions also check the valid entries of the skipping load instruction tracking unit of other processing units for address tags that match the tag of the store instruction. If a match is found the write flag of the entry in skipping load instruction tracking unit 240 is set. A specific example is presented below that further clarifies the use of skipping load instruction tracking units.

Figure 3:
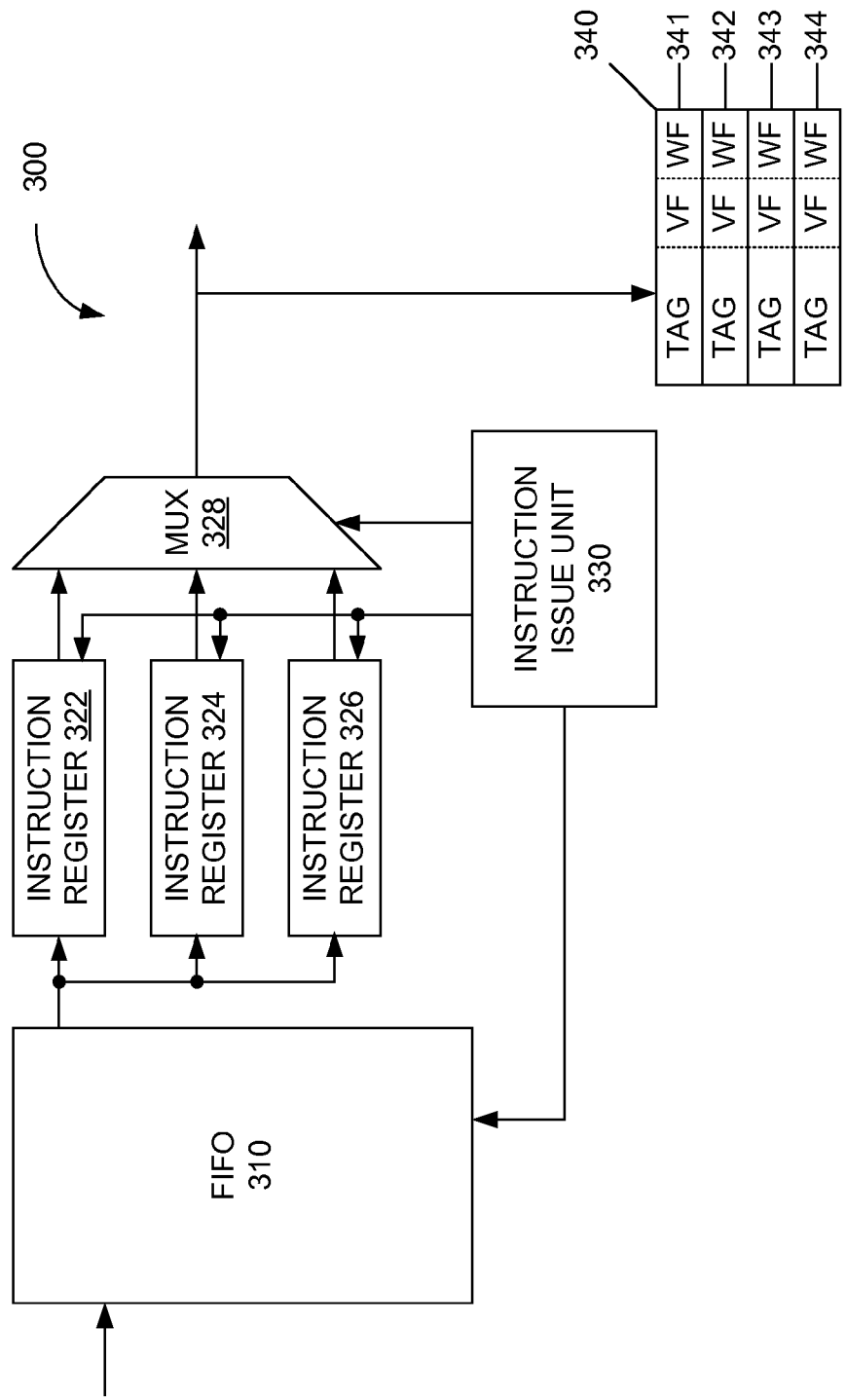
FIG. 3 is a simplified block diagram of a load scheduler in accordance with one embodiment of the present invention.

FIG. 3 is a block diagram of a load scheduler 300 in accordance with another embodiment of the present invention. Load scheduler 300 uses a FIFO 310 as the primary instruction buffer (of FIG. 2). Furthermore, fast instruction buffer 220 of FIG. 2 is implemented with three instruction registers 322, 324, 326 and a multiplexer (MUX) 328. The input ports of instruction registers 322, 324 and 326 are coupled to receive instruction from FIFO 310. The oldest load instruction in FIFO 310 is transferred from FIFO 310 into instruction registers 322, 324, or 326 whenever the one of the instruction registers is available. The output ports of instruction register 322, 324, and 326 are coupled to the input ports multiplexer (MUX) 328. Instruction issue unit 330 controls multiplexer 328 to output the issuing load instruction from the appropriate instruction register. Skipping load instruction tracking unit 340 of load scheduler 300 is shown to have four entries 341, 342, 343, and 344. Each entry includes a tag field TAG, a valid flag VF, and a write flag WF.

As explained above, When instruction issue unit 330 issues a skipping load instruction the valid flag of an entry of skipping load instruction tracking unit 340 is set and an address tag for the skipping load instruction is stored in the tag field TAG of the entry. When a store instruction is executed the valid entries of the skipping load instruction tracking unit 340 are checked for address tags that match the address tag of the store instruction. If a match is found the write flag of the entry in skipping load instruction tracking unit 340 is set. The store instruction may have been executed in another processing unit. When a skipped load instruction issues, the valid entries of skipping load instruction tracking unit 340 are checked for address tags that match the address tag of the skipped load instruction. A hazard is detected if a match is found and the write flag is set. When hazards are found the skipping load instruction that corresponds to the entry of skipping load instruction tracking unit 340 is flushed from the load pipeline and must be reissued.

Figure 4A:
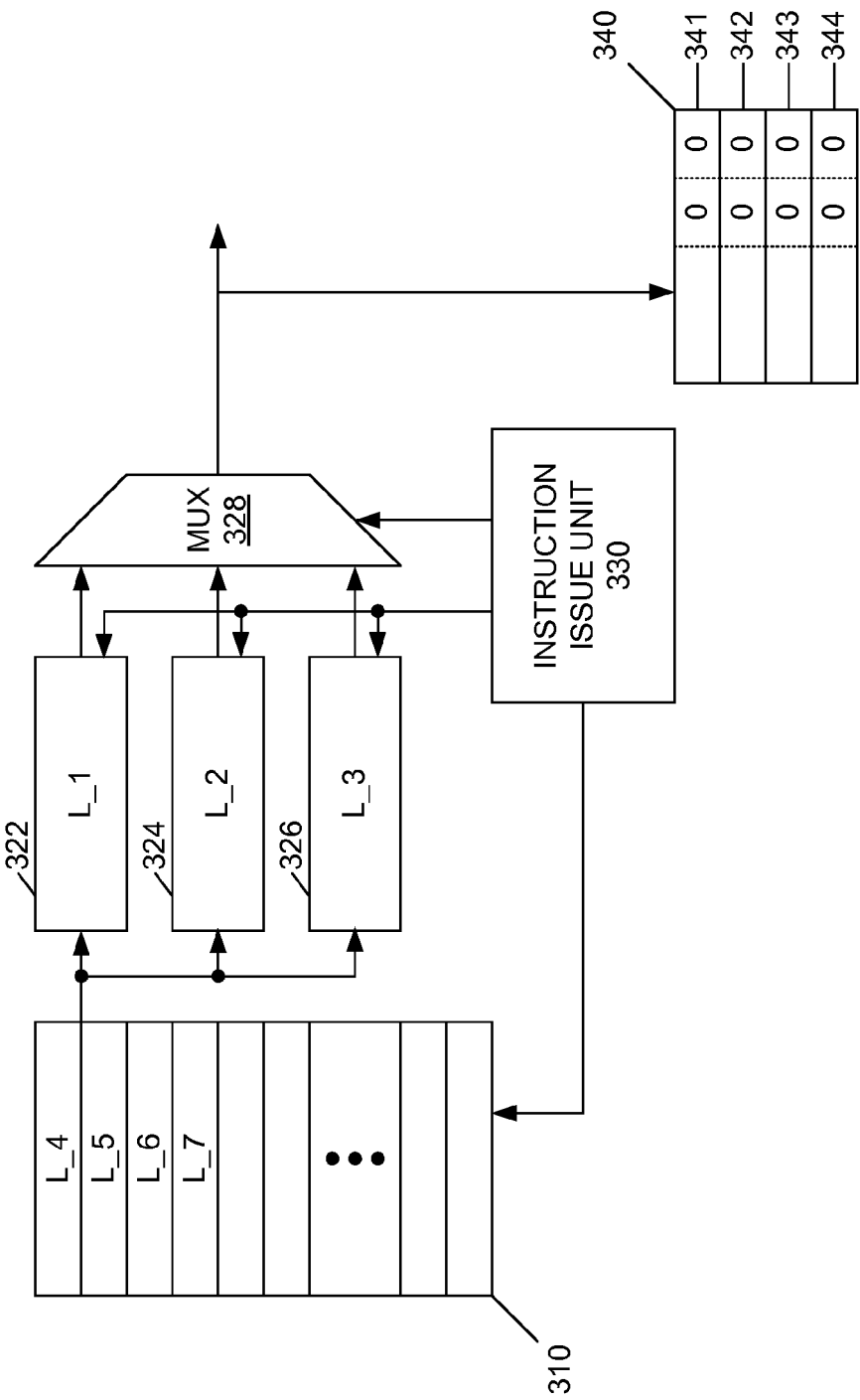
FIGS. 4A-4H illustrates the performance of a load scheduler in accordance with one embodiment of the present invention.

FIGS. 4A-4H provide a specific example for the function of instruction issue unit 330 and skipping load instruction tracking unit 340. For the example of FIGS. 4A-4H, max skipping threshold T_Sing is set equal to three and max skipped threshold T_Sed is set equal to one. As illustrated in FIG. 4A load scheduler 300 has received seven load instructions L_1, L_2, L_3, L_4, L_5, L_6 and L_7. For clarity, load instruction L_1 was received before load instruction L_2 and in general load instruction L_N is followed by load instruction L_N+1. Thus, load instruction L_1 is the first oldest load instruction; load instruction L_2 is the second oldest load instruction; load instruction L_3 is the third oldest load instruction, load instruction L_4 is the fourth oldest load instruction, etc. Load instructions L_1, L_2, and L_3 have already been transferred from FIFO 310 to instruction registers 322, 324, and 326 respectively. However load instructions L_4, L_5, L_6 and L_7 still remain in FIFO 310. Currently since no instructions have issued, there are no valid entries in skipping load instruction tracking unit 340 as indicated by a "0" in the valid flags of the entries of skipping load instruction tracking unit 340. Similarly the write flags of the entries are also invalid as indicated by a "0" in the write flags.

Figure 4B:
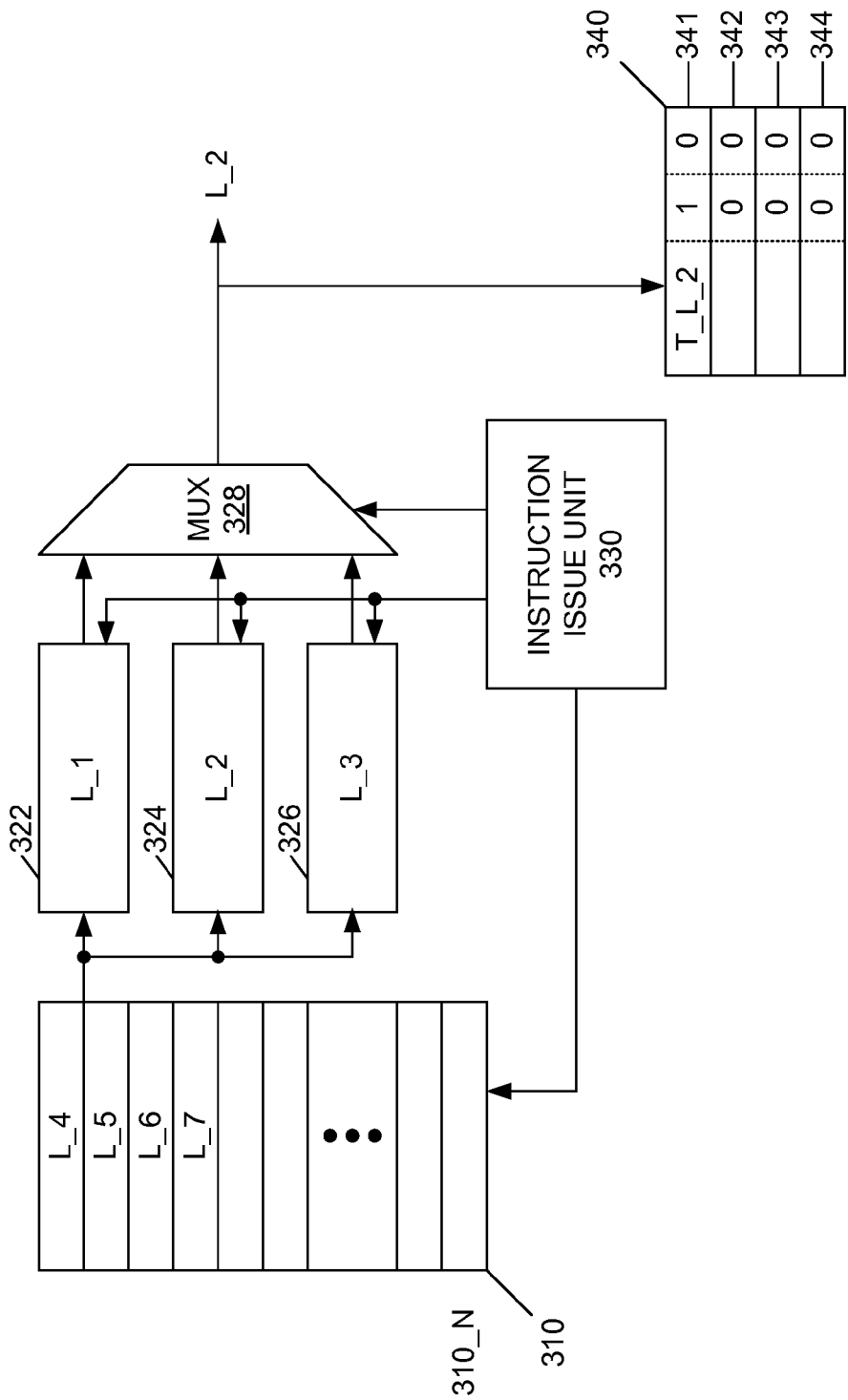

For this example, assume load instruction L_1 has an unresolved dependency but load instruction L_2 and load instruction L_3 become ready for issue, i.e. load instructions L_2 and L_3 are "ready load instructions", i.e. load instructions that are ready to issue. When multiple load instructions are ready to issue, the oldest ready load instruction should issue prior to younger ready load instruction to minimize the number of skipped load instructions. Therefore, instruction issue unit 330 processes load instruction L_2 prior to load instruction L_3. Specifically, instruction issue unit 330 determines whether load instruction L_2 is a skipping load instruction. Because load instruction L_2 is going to be issued before load instruction L_1, load instruction L_2 would be a skipping load instruction and load instruction L_1 would become a skipped load instruction. Instruction issue unit 330 determines whether issuing load instruction L_2 would violate max skipping threshold T_Sing (three in this example) or max skipped threshold T_Sed (one in this example). In this case the number of skipping load instruction would be one (i.e. load instruction L_2) which is less than or equal to max skipping threshold T_Sing and the number of skipped load instruction (i.e. load instruction L_1) would also be one which is less than or equal to max skipped threshold T_Sed. Therefore, instruction issue unit 330 can issue load instruction L_2 through multiplexer 328 as illustrated in FIG. 4B. Furthermore, because load instruction L_2 is a skipping load instruction, skipping load instruction tracking unit 340 is updated with information regarding load instruction L_2. Specifically, address tag T_L_2 is formed from the physical address in load instruction L_2 and stored in the tag field of entry 341. In addition, the valid flag of entry 341 is set to a valid state, i.e. "1" in this example. Furthermore, the write flag of entry 341 is set to an invalid state, i.e. "0" in this example. Instruction issue unit 230 must also determine whether the issuing instruction is a skipped load instruction. When a skipped load instruction issues, the valid entries of the skipping load instruction tracking unit are checked for address tags that match the tag of the skipped load instruction. However, load instruction L_2 is not a skipped load instruction. After load instruction L_2 is issued, instruction register 324 becomes available to receive the oldest load instruction in FIFO 310.

Figure 4C:
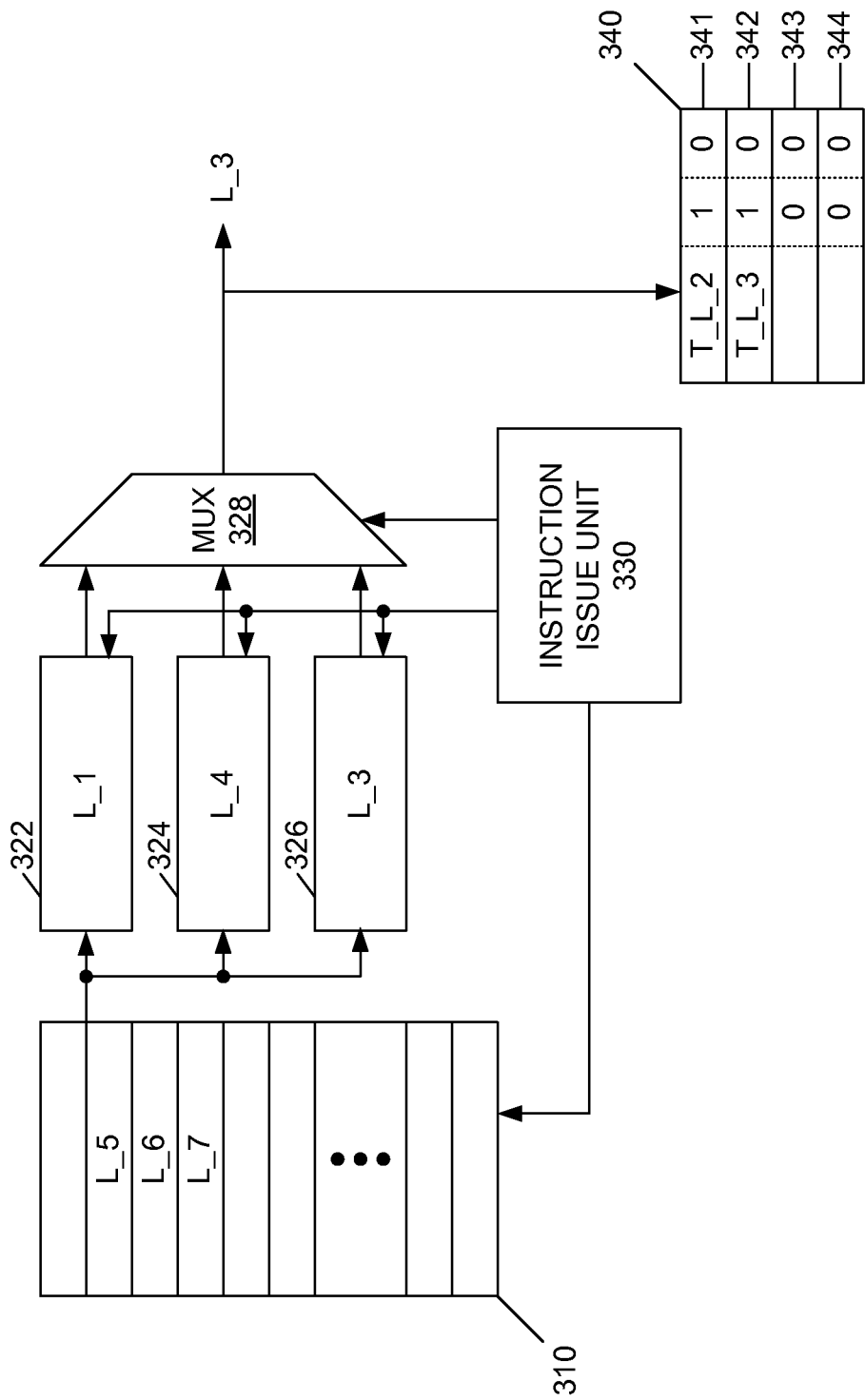

In FIG. 4C, load instruction L_4 has been moved from FIFO 310 into instruction register 324. Load instruction L_3 is ready to issue, but load instruction L_1 is still not ready. Accordingly, instruction issue unit 330 determines whether issuing load instruction L_3 would violate max skipping threshold T_Sing (three in this example) or max skipped threshold T_Sed (one in this example). In this case the number of skipping load instruction would be two (load instructions L_2 and L_3) which is less than or equal to max skipping threshold T_Sing and the number of skipped load instruction would be one (load instruction L_1) which is less than or equal to max skipped threshold T_Sed. Therefore, instruction issue unit 330 can issue load instruction L_3 through multiplexer 328 as illustrated in FIG. 4C. Furthermore, because load instruction L_3 is a skipping load instruction skipping load instruction tracking unit 340 is updated with information regarding load instruction L_3. Specifically, address tag T_L_3 is formed from the physical address in load instruction L_3 and stored in the tag field of entry 342. In addition, the valid flag of entry 342 is set to a valid state, i.e. "1" in this example. Furthermore, the write flag of entry 342 is set to in invalid state, i.e. "0" in this example. Instruction issue unit 330 also determines that load instruction L_3 is not a skipped load instruction. After load instruction L_3 is issued, instruction register 326 becomes available to receive the oldest load instruction in FIFO 310.

Figure 4D:
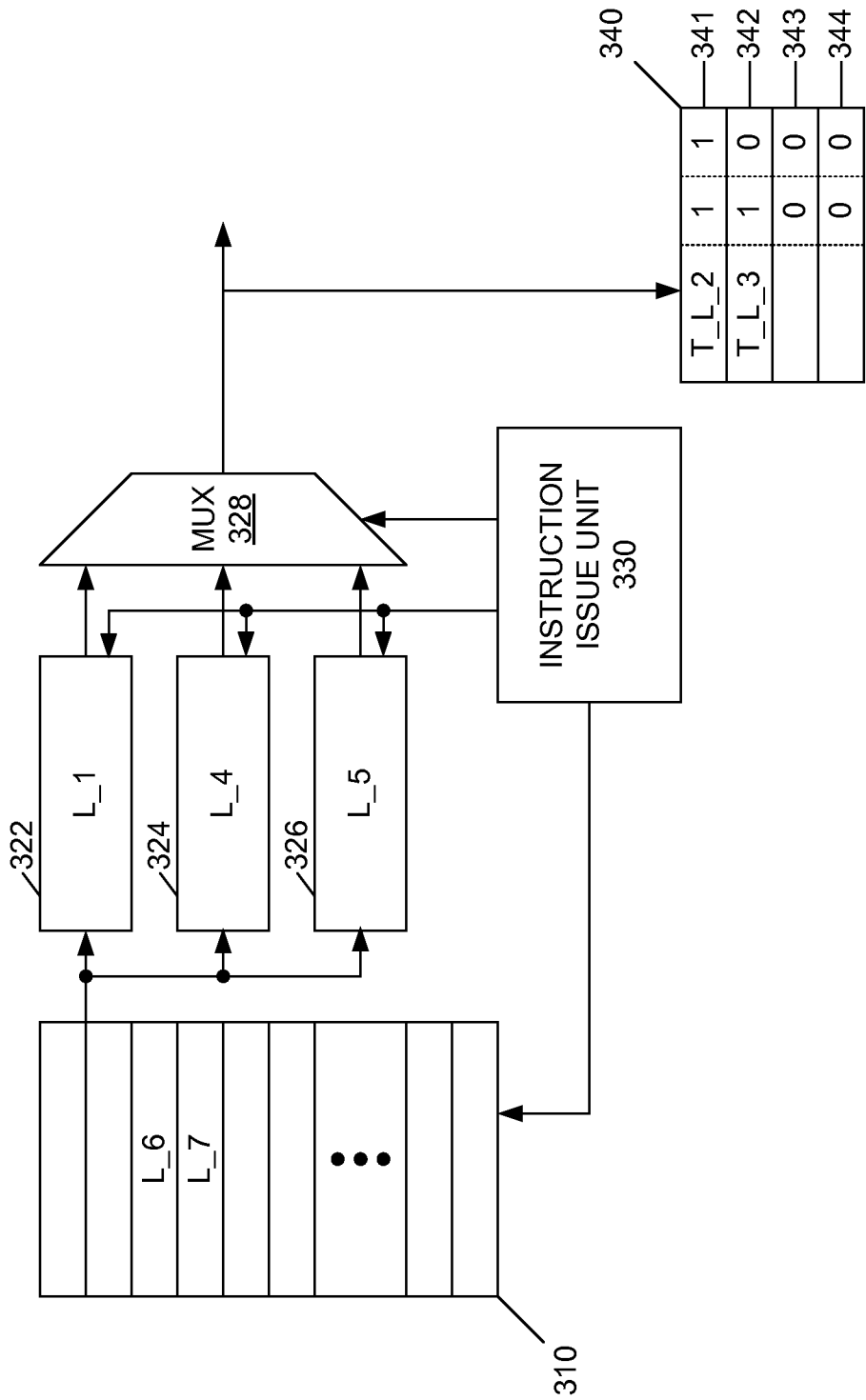

In FIG. 4D, load instruction L_5 has been moved from FIFO 310 into instruction register 326. In addition, a store instruction with an address tag that matches address tag T_L_2 has been executed. Thus, the write flag in entry 341 of skipping load instruction tracking unit 340 has been set to a valid state, i.e. "1" in this example. In a system with multiple processing units, the store instruction may have been executed by another processing unit. Load instruction L_5 is ready to issue, but load instruction L_1 and load instruction L_4 are not ready. Accordingly, instruction issue unit 330 determines whether issuing load instruction L_5 would violate max skipping threshold T_Sing (three in this example) or max skipped threshold T_Sed (one in this example). If load instruction L_5 were to issue, the number of skipping load instruction would be three (load instructions L_2, L3, and L_5) which is less than or equal to max skipping threshold T_Sing and the number of skipped load instruction would be two (load instructions L_1 and L_4) which greater than or max skipped threshold T_Sed. Therefore, issuing load instruction L_5 would violate max skipped threshold T_Sed. Accordingly, instruction issue unit 330 does not issue load instruction L_5 or any other load instruction at this time.

Figure 4E:
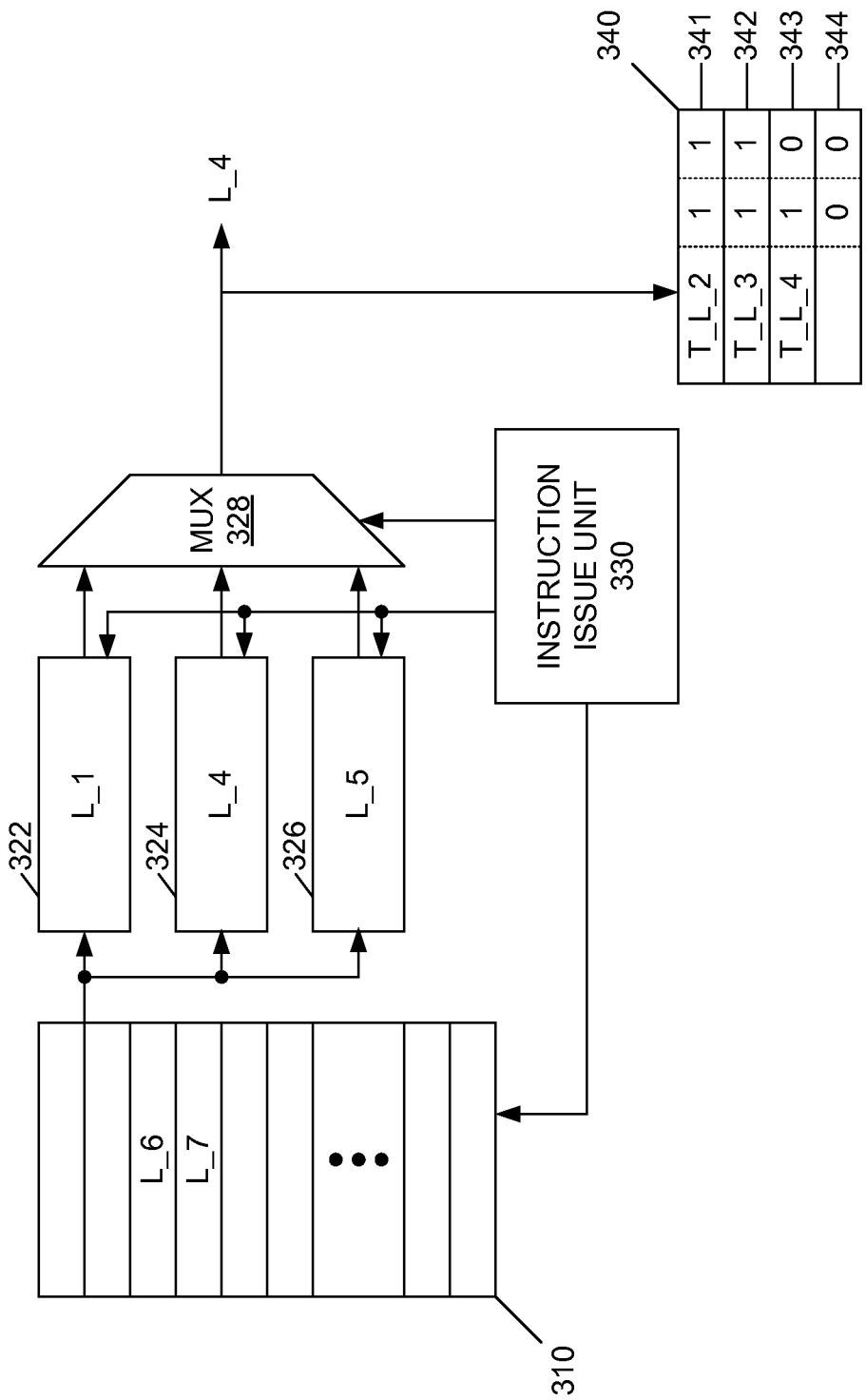

In FIG. 4E, load instruction L_4 has become ready to issue but load instruction L_1 is still not ready. In addition, a store instruction with an address tag that matches address tag T_L_3 has been executed. Thus, the write flag in entry 342 of skipping load instruction tracking unit 340 has been set to a valid state, i.e. "1" in this example. Load instruction L_5, which was already ready to issue in FIG. 4D is still ready to issue. However, because load instruction L_4 is older than load instruction L_5, instruction issue unit 330 processes load instruction L_4. Specifically, instruction issue unit 330 determines whether issuing load instruction L_4 would violate max skipping threshold T_Sing (three in this example) or max skipped threshold T_Sed (one in this example). If load instruction L_4 were to issue, the number of skipping load instruction would be three (load instructions L_2, L_3, and L_4) which is less than or equal to max skipping threshold T_Sing and the number of skipped load instruction would be one (load instruction L_1) which is less than or equal to max skipped threshold T_Sed. Therefore, instruction issue unit 330 can issue load instruction L_4 through multiplexer 328 as illustrated in FIG. 4E. Furthermore, because load instruction L__4 is a skipping load instruction, skipping load instruction tracking unit 340 is updated with information regarding load instruction L__4. Specifically, address tag T_L__4 is formed from the physical address of load instruction L__4 and stored in the tag field of entry 343. In addition, the valid flag of entry 343 is set to a valid state, i.e. "1" in this example. Furthermore, the write flag of entry 343 is set to an invalid sate, i.e. "0" in this example. Instruction issue unit 330 also determines that load instruction L__3 is not a skipped load instruction. After load instruction L__4 is issued, instruction register 324 becomes available to receive the oldest load instruction in FIFO 310.

Figure 4F:
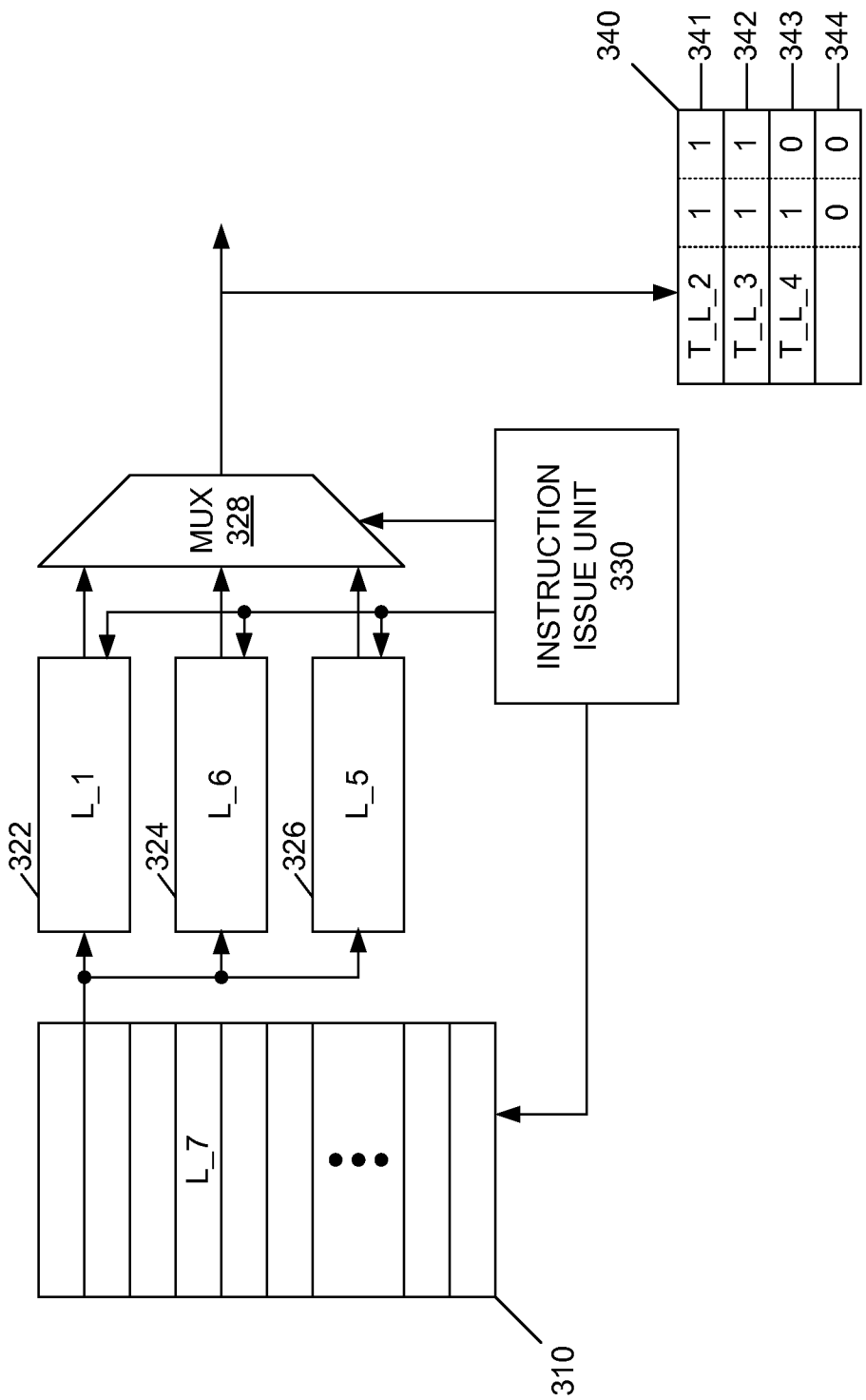

In FIG. 4F, load instruction L__6 has been moved from FIFO 310 into instruction register 324. Load instruction L__5 remains ready to issue, but load instruction L__1 and load instruction L__6 are not ready to issue. Accordingly, instruction issue unit 330 determines whether issuing load instruction L__5 would violate max skipping threshold T_Sing (three in this example) or max skipped threshold T_Sed (one in this example). If load instruction L__5 were to issue, the number of skipping load instruction would be four (load instructions L__2, L__3, L__4, and L__5) which is greater than max skipping threshold T_Sing and the number of skipped load instruction would be one (load instructions L__1) which is less than or equal to max skipped threshold T_Sed. Therefore, issuing load instruction L__5 would violate max skipping threshold T_Sing. Accordingly, instruction issue unit 330 does not issue load instruction L__5 or any other load instruction at this time.

Figure 4G:
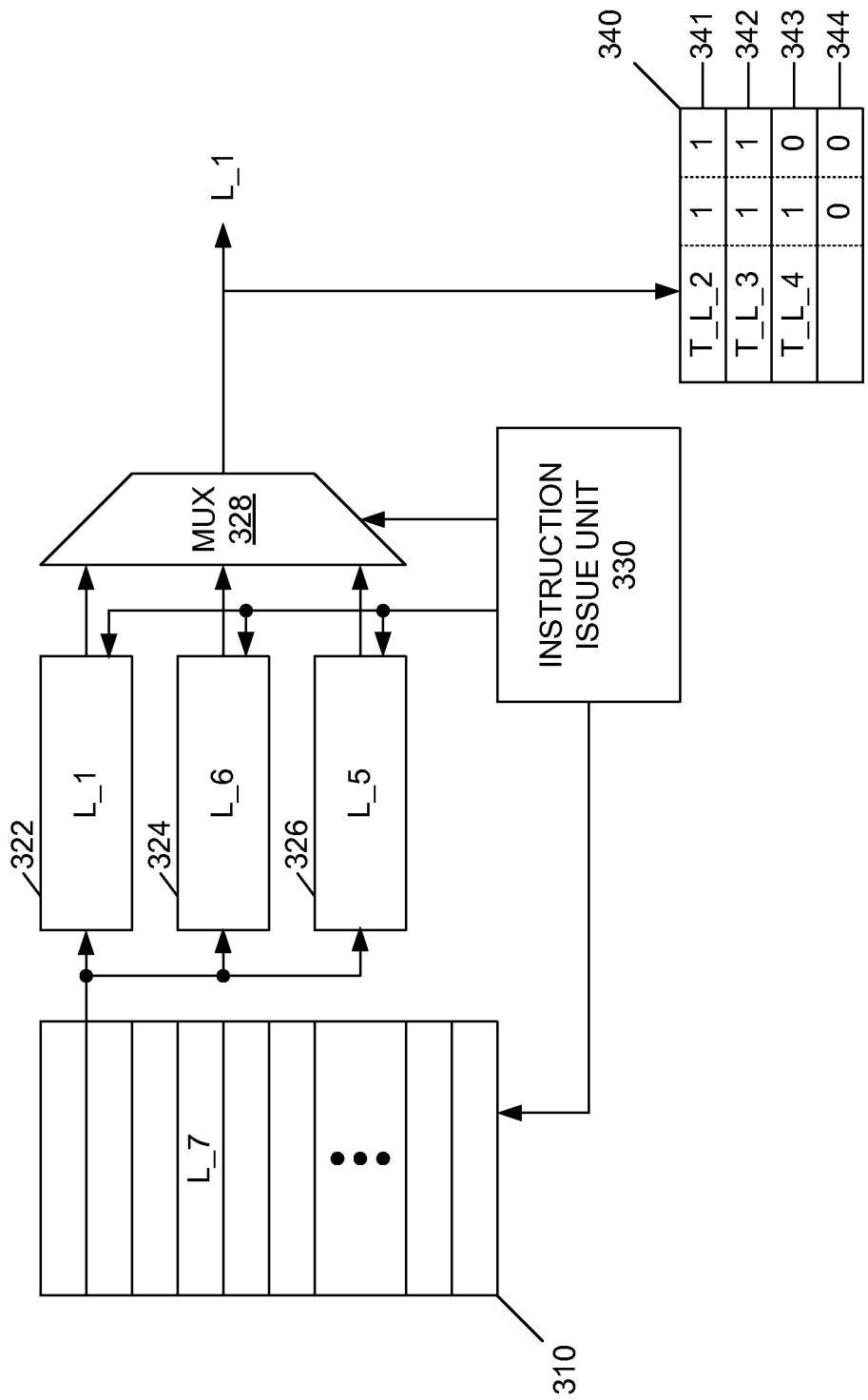

In FIG. 4G, load instruction L__1 has finally become ready to issue, load instruction L__5 is still ready to issue, and load instruction L__6 is not ready to issue. Because load instruction L__1 is older than load instruction L__5, instruction issue unit 330 processes load instruction L__1. Specifically, instruction issue unit 330 determines whether issuing load instruction L__1 would violate max skipping threshold T_Sing (three in this example) or max skipped threshold T_Sed (one in this example). If instruction L__1 were to be issued, the number of skipping load instruction would be zero because issuing load instruction L__1 would change the status of load instructions L__2, L__3, and L__4 to not be skipping load instructions. Similarly, issuing load instruction L__1 would make the number of skipped load instruction be zero since load instruction L__1 was the only skipped load instruction. Thus issuing load instruction L__1 would result in the number of skipping load instructions to be less than or equal to max skipping threshold T_Sing and the number if skipped load instructions to be less than or equal to max skipped threshold T_Sed. Therefore, instruction issue unit 330 can issue load instruction L__1 through multiplexer 328 as illustrated in FIG. 4G. Furthermore, because load instruction L__1 is a skipped load instruction skipping load instruction tracking unit 340 must be checked for hazards. Specifically, address tag T_L__1 is formed from the physical address in load instruction L__1 and compared to the address tags in entries of skipping load instruction tracking unit 340 that are valid. i.e. having valid flag set to "1". As shown in FIG. 4G entries 341, 342 and 343 would need to be checked for hazards. Thus, address tag T_L__1 is compared with address tags T_L__2, T_L__3, T_L__3. If a match is found for an entry, then the write flag of the entry is checked. If the write flag is set then load instruction associated with the entry must be flushed. Therefore, if address tag T_L__1 matches address tag T_L__2 then load instruction L__2 must be flushed and reissued. Similarly, if address tag T_L__1 matches address tag T_L__3 then load instruction L__3 must be flushed and reissued. However, if address tag T_L__1 matches address tag T_L__4, load instruction L__4 would not need to be flushed because no store instructions with a matching address tag were issued between the issuance of load instructions L__1 and L__4. In some embodiments of the present invention, address tags are compared only if an entry both the write flag and valid flags are set. Assume for this example that address tag T_L__1 matches address tag T_L__2 but does not match address tags T_L__3 and T_L__4. Then, load instruction L__2 must be flushed and reissued.

In some embodiments of the present invention load instruction L__2 would be returned to the load scheduler directly and would appear in FIFO 310. However, in most embodiments of the present invention, a flushed instruction is returned to the instruction decoder. In general instructions (both loads and non-load instructions) that are dependent on load instruction L__2, such as instructions that use the data from load instruction L__2 should be flushed and reissued as well.

Tracking of load instructions L__3 and L__4 as skipping load instructions can be suspended because they are no longer skipping any load instructions after load instruction L__1 has issued. Furthermore the reissuance of load instruction L__2 should not cause a hazard with load instruction L__3 and L__4 because the address tag T_L__2 does not match address tags T_L__3 or T_L__4. Therefore, entries 341, 342 and 343 of skipping load instruction tracking unit 340 can be cleared by unsetting the valid flags (i.e. writing a "0" in this example) of entries 341, 342, and 343 (see FIG. 4H). After load instruction L__1 is issued, instruction register 322 becomes available to receive the oldest load instruction in FIFO 310.

Additional complications would be caused of address tag T_L__4 (or T_L__3) also matches address tag T_L__1 and address tag T_L__2. In this situation flushing and reissuing load instruction L__2 may result in a conflict between the data retrieved by load instruction L__2 and the data retrieved by load instruction L__4. Specifically, a store instruction may change the data between the time the data is retrieved by load instruction L__4 and the time the data is retrieved by load instruction L__2. Accordingly, in some embodiments of the present invention, if any skipping load instruction is flushed, then all other skipping load instructions with a matching address tag are also flushed. In still other embodiments of the present invention, if any skipping load instruction is flushed then all skipping load instructions issued after the skipping load instruction are also flushed. Furthermore, some embodiments of the present invention flush all instructions (i.e. not just load instructions) that issued after the skipping load instruction.

Figure 4H:
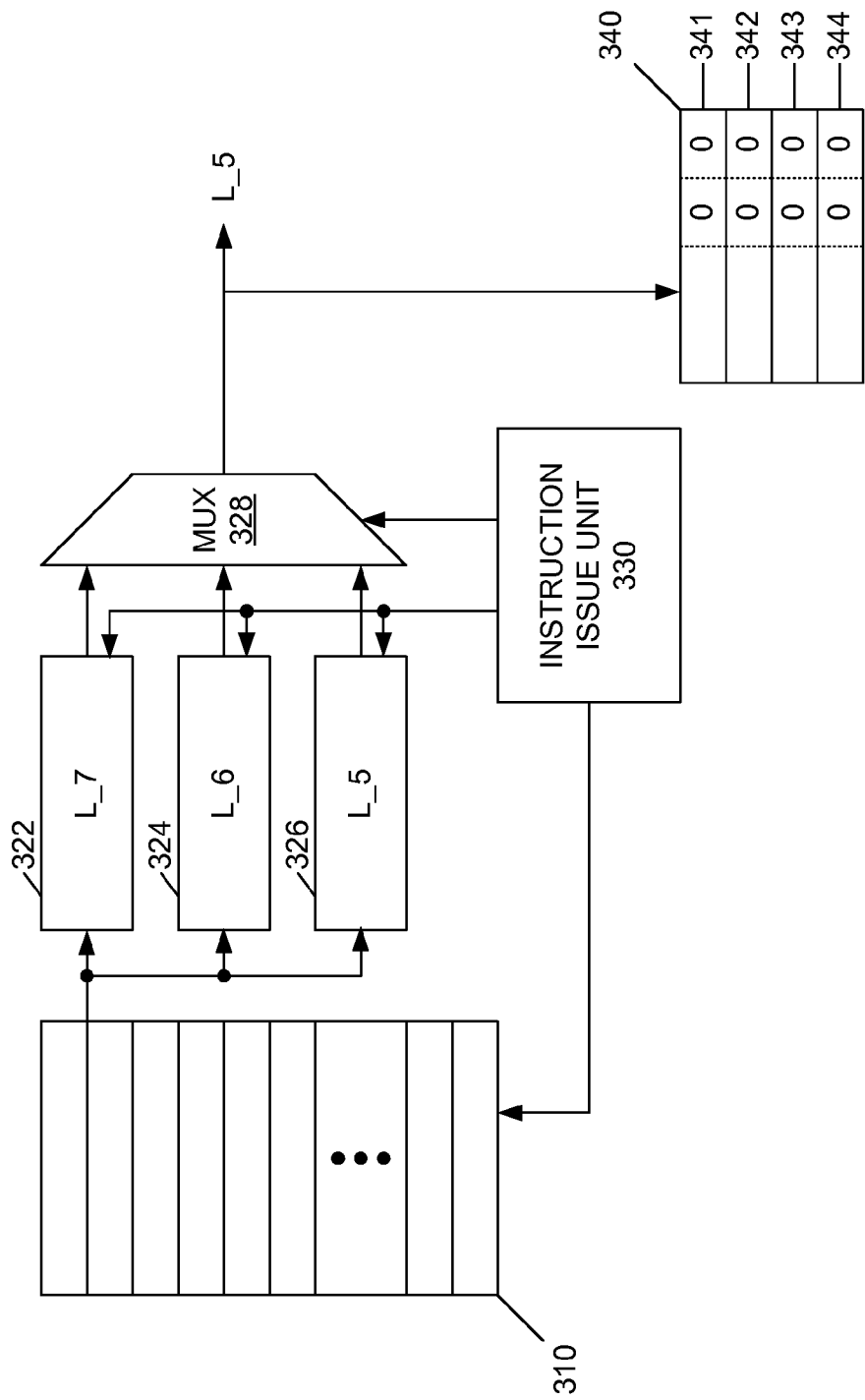

In FIG. 4H, load instruction L__7 is moved from FIFO 310 to instruction register 322. Load instruction L__5, which is now the oldest instruction is ready to issue. Because load instruction L__5 is the oldest instruction, instruction issue unit 330 process load instruction L__5 regardless of the readiness of load instructions L__6 and L__7. Specifically, instruction issue unit 330 determines whether issuing load instruction L__5 would make load instruction L__5 a skipping load instruction and if so must determine whether the number of skipped load instruction increases. Since L__5 is the oldest load instruction, L__5 is not a skipping load instruction and no skipped load instructions are created. Next, instruction issue unit 330 determines whether issuing load instruction L__5 would violate max skipping threshold T_Sing (three in this example) or max skipped threshold T_Sed (one in this example). If load instruction L__5 were to be issued, the number of skipping load instruction would be zero which is less than or equal to max skipping threshold T_Sing and the number of skipped load instruction would be zero which is less than or equal to max skipped threshold T_Sed. Therefore, instruction issue unit 330 can issue load instruction L__5 through multiplexer 328 as illustrated in FIG. 4H. Because, load instruction L__5 is neither a skipping load instruction nor a skipped load instruction skipping load instruction tracking unit 340 is not used during the issuance of load instruction L__5. Load instructions L__6 and L__7 as well as additional load instruction received in FIFO 310 would be processed in the same manner as described above for load instructions L__1 to L__5.

Figure 5:
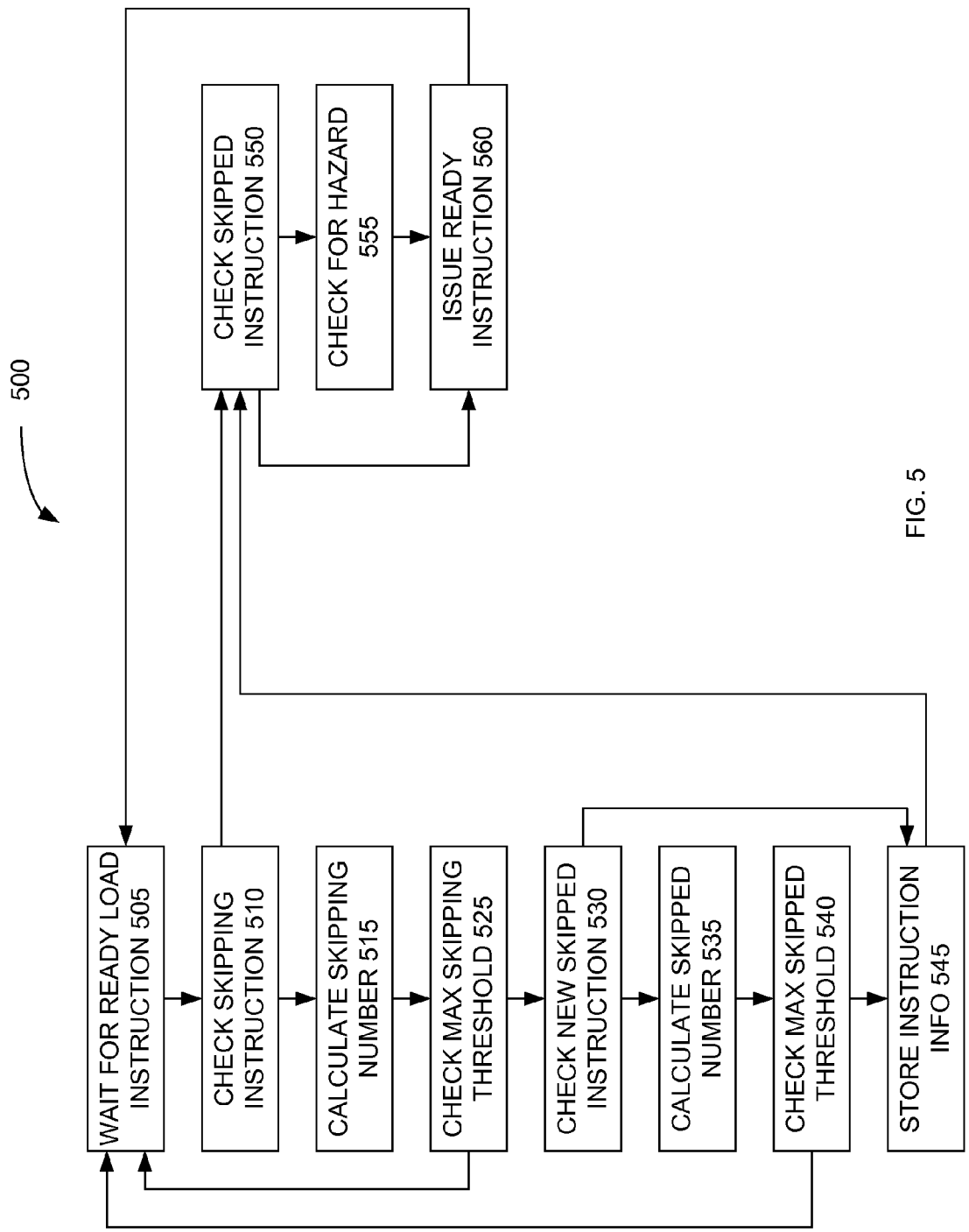
FIG. 5 is a flow diagram for a load scheduler in accordance with one embodiment of the present invention.

FIG. 5 is a flow diagram 500 illustrating the function of an instruction issue unit in accordance with one embodiment of the present invention. Specifically, the instruction issue unit waits for a ready load instruction, i.e. an instruction that is ready to issue, in WAIT FOR READY LOAD INSTRUCTION 505. Once an instruction is ready to be issued, instruction issue unit 330 determines whether the instruction ready to be issued would be a skipping load instruction in CHECK SKIPPING LOAD INSTRUCTION 510. An instruction is a skipping load instruction if there is an older load instruction that has not been issued yet. If the instruction ready to be issued is a skipping load instruction, the instruction issue unit proceeds to CALCULATE SKIPPING NUMBER 515; otherwise, the instruction issue unit proceeds to CHECK SKIPPED LOAD INSTRUCTION 550. As explained above, when multiple instructions are ready to issue, the instruction issue unit would process the oldest instruction that is ready to issue first.

In CALCULATE SKIPPING NUMBER 515 the instruction issue unit calculates the number of skipping load instructions there would be if the ready load instruction is issued. Then the instruction issue unit checks the calculated number of skipping load instructions against max skipping threshold T_Sing in CHECK MAX SKIPPING THRESHOLD 525. If the calculated number of skipping load instructions is less than or equal to max skipping threshold T_Sing then the instruction issue unit proceeds to CHECK NEW SKIPPED LOAD INSTRUCTION 530; otherwise the instruction issue unit returns to WAIT FOR READY LOAD INSTRUCTION 505 because the current ready load instruction can not be issued because issuing the current ready load instruction would violate the max skipping threshold.

In CHECK NEW SKIPPED LOAD INSTRUCTION 530, the instruction issue unit determines whether issuing the current ready load instruction would create more skipped load instructions. If additional skipped load instructions would be created then the instruction issue unit calculates the number of skipped load instructions in CALCULATE SKIPPED NUMBER 535 and then proceeds to CHECK MAX SKIPPED THRESHOLD 540. If no additional skipped load instruction would be created, instruction issue unit can proceed directly to STORE INSTRUCTION INFO 545. However some embodiments of the present invention may perform the functions in CALCULATE SKIPPED NUMBER 535 and CHECK MAX SKIPPED THRESHOLD 540 even when no additional skipped load instructions would be created by issuing the ready load instruction.

In CHECK MAX SKIPPED THRESHOLD 540, the instruction issue unit checks the calculated number of skipped load instructions against max skipped threshold T_Sed. If the calculated number of skipped load instructions is less than or equal to max skipped threshold T_Sed then the instruction issue unit proceeds to STORE INSTRUCTION INFO 545; otherwise the instruction issue unit returns to WAIT FOR READY LOAD INSTRUCTION 505 because the current ready load instruction can not be issued because issuance of the ready load instruction would create additional skipped load instruction that would exceed the maximum number of skipped load instructions.

In STORE INSTRUCTION INFO 540, information regarding the ready load instruction (which is also a skipping load instruction) is stored in an entry of the skipping load instruction tracking unit. The information can include an address tag, a secondary address tag, or other identifying information. In addition, a valid flag for the entry is set. In one embodiment of the present invention, the address tag is a 10 bit hash of the physical address of the load instruction, with the hash value being set equal to PA[25:16]^PA[15:6], where PA[25:16] are bits 25, 24, 23, 22, 21, 20, 19, 18, 17, and 16 of the physical address, PA[15:6] are bits 15, 14, 13, 12, 11, 10, 9, 8, 7 and 6 of the physical address, "^" is a bitwise exclusive "OR" function. After the appropriate information is stored in the skipping load instruction tracking unit, the instruction issue unit proceeds to CHECK SKIPPED LOAD INSTRUCTION 550.

In CHECK SKIPPED INSTRUCTION 550, the instruction issue unit determines whether the ready load instruction that is going to be issued is a skipped load instruction. If the ready load instruction that is going to be issued is a skipped load instruction that the instruction issue unit must check for hazards in CHECK FOR HAZARD 555. Otherwise the instruction issue unit can issue the ready load instruction in ISSUE READY LOAD INSTRUCTION 560.

In CHECK FOR HAZARD 555, the instruction issue unit compares an address tag of the ready load instruction against the address tags in valid entries of the skipping load instruction tracking unit. If the address tag of the ready load instruction matches the address tag in a valid entry that also has been matched by a store instruction (as indicated by the write flag being set) then the load instruction corresponding to that entry must be flushed and reissued. If the ready entry is the last instruction skipped by any of the skipping load instruction then the skipping load instruction is no longer a skipping load instruction and the entry can be invalidated by unsetting the valid flag of the entry. However, if the ready load instruction is not the last instruction skipped by a skipping load instruction then the skipping load instruction remains a skipping load instruction and the entry corresponding to the skipping load instruction should remain valid. For example if load instructions L__1, L__2, and L__3 are received in order and load instruction L__1 and L__2 are skipped load instruction still residing in fast instruction buffer 220 (FIG. 2), load instruction L__3 is a skipping load instruction that has already issued then load instruction L__3 has skipped both load instruction L__1 and load instruction L__2. Load instruction L__2 becomes ready to issue and is issued. Because load instruction L__3 skipped both load instruction L__1 and load instruction L__2, the entry in the skipping load instruction track unit for load instruction L__3 remains valid even after load instruction L__2 issues. However, after both load instruction L__1 and load instruction L__2 has issued then the entry in the skipping load instruction track unit for load instruction L__3 is invalidated. In some embodiments of the present invention, each entry in the skipping load instruction tracking unit includes a plurality of skipped load flags, which indicate which of the skipped load instructions are skipped by the skipping instruction. When a current skipped load is issued, then the skipped load flags matching the current skipped load instruction are cleared. When an the last skipped load flag in an entry is cleared then the entry can be cleared because the skipping load instruction being traced by the entry is no longer a skipping load instruction because all the skipped load instructions has been issued.

As explained above, some embodiments of the present invention would also flush any instruction that is dependent on the skipping instruction that is being flushed. Other embodiments flush all skipping load instructions that were issued after the skipping load instruction being flushed. Still other embodiments of the present invention would flush all instructions issued after the skipping load instruction being flushed. However, the skipped instruction that caused the flushing of the skipping instruction does not need to be flushed.

After CHECK FOR HAZARD 555, the issue instruction unit issues the ready load instruction in ISSUE READY LOAD INSTRUCTION 560. Issuing of the ready load instruction allows the oldest instruction in the primary instruction buffer (FIG. 2 or FIFO in FIG. 3) to be transferred to the fast instruction buffer (FIG. 2 or an instruction register in FIG. 3). After issuing the ready load instruction, the issue instruction unit returns to WAIT FOR READY LOAD INSTRUCTION 505 and waits for another ready load instruction, i.e. an instruction that is ready to issue.

The flow diagram 500 of FIG. 5 is represents a specific embodiment of the present invention. Other embodiments of the present invention may change the order of operation in FIG. 5. For example, one embodiment may check max skipped threshold T_Sed before checking max skipping threshold T_Sing. Another embodiment may check whether the ready instruction is a skipped instruction prior to checking to see if the ready instruction is a skipping load instruction. Still other embodiments of the present invention may combine do two or more of the operations or perform multiple operations simultaneously. Still other embodiments may not perform all the operations shown in FIG. 5.

Figure 6:
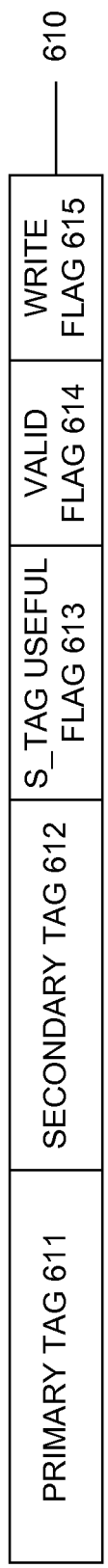
FIG. 6 illustrates an entry in a skipping load instruction tracking unit in accordance with one embodiment of the present invention.

As mentioned above, some embodiments of the present invention have a multiple tag fields in each entry of the skipping load instruction tracking unit. FIG. 6 shows an entry 610 of a skipping load instruction tracking unit in accordance with one embodiment of the present invention. Entry 610 includes a primary tag field 611, a secondary tag field 612, a secondary tag useful flag (S_TAG USEFUL FLAG) 613, a valid flag 614, and a write flag 515. Primary tag field 611, valid flag 614, and write flag 615 perform the same functions tag field TAG, valid flag VF, and write flag WF of FIG. 3, respectively. Secondary tag 612 is used for certain types of load instructions, such as doubleword aligned loads, that would benefit from more precise matching of tag fields. For convenience, the term "precision load instructions" is used for load instructions that make use of secondary tag field 612. When a precision load instruction is issued as a skipping load instruction, a secondary address tag based on the address of the precision load instruction is created and stored in the secondary tag field 612. Furthermore, the secondary tag useful flag is set to a valid state. Then when a skipped precision load instruction is issued, the instruction issue unit determines that the skipped precision load instruction matches an entry only if the primary address tags match, the secondary tag useful flag is set, and the secondary address tags match. In a specific embodiment of the present invention the secondary address tag is equal to PA[5:3], which is bit number 5, 4, and 3 of the physical address.

To conserve resources, some embodiments of the present invention have the number of entries in the skipping load instruction tracking unit be the same as max skipping threshold T_Sing. However, in other embodiments of the present invention, a single load instruction, such as a split misaligned load instruction, may be separated into two or more load instructions after being issued. In these embodiments, having a more entries in the skipping load instruction tracking unit would be beneficial. However, it may not be practical to have enough entries for the rare cases of having multiple split load instructions close together. Thus, some of these embodiments of the present invention may have a warning mechanism when the capacity of the skipping load instruction tracking unit is exceeded. Once the when the capacity of the skipping load instruction tracking unit is exceeded the tracking of the out of order load instructions becomes corrupted, which may cause the instruction issue unit to flush the skipping load instructions.

Figure 7:
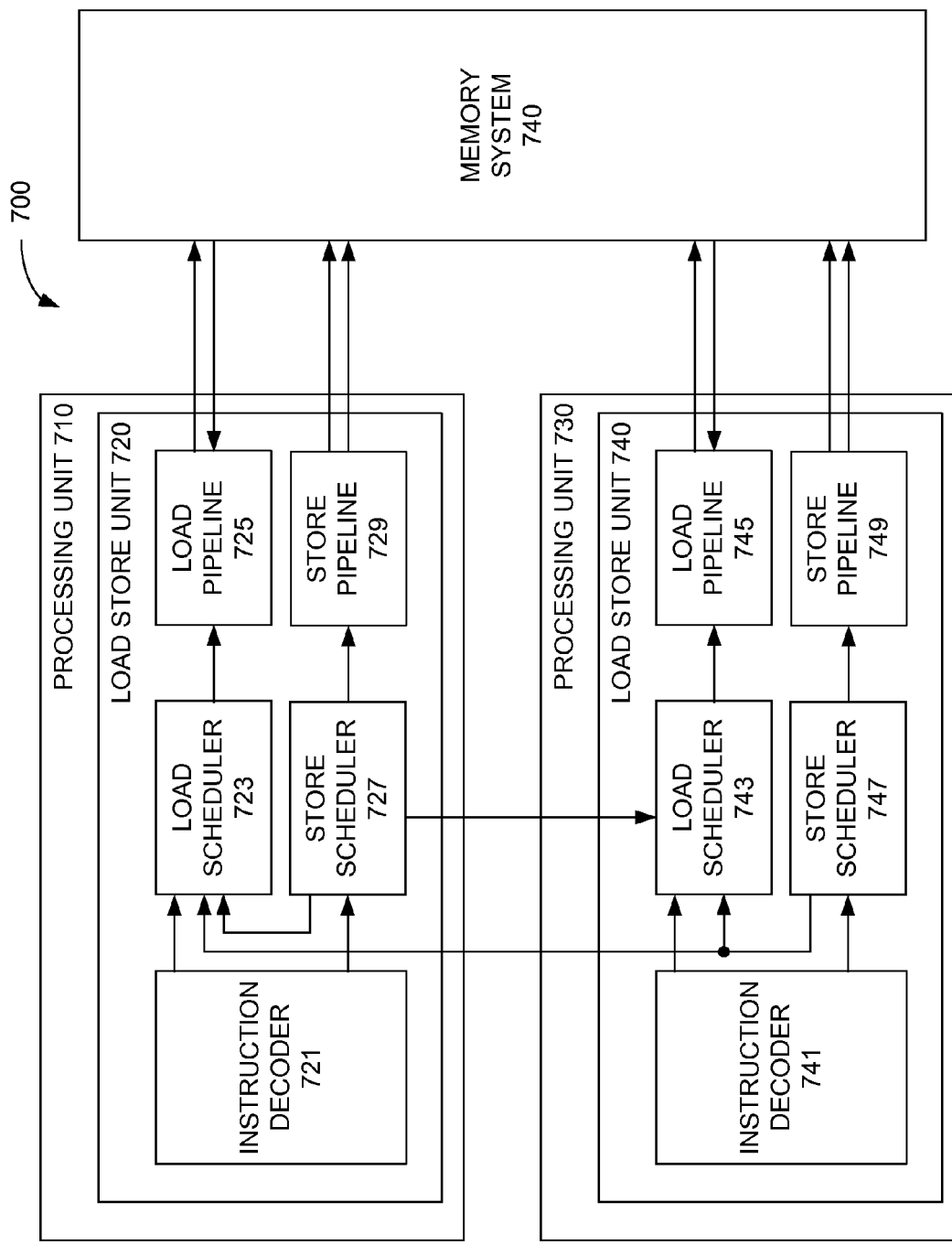
FIG. 7 is a block diagram of a processing system in accordance with one embodiment of the present invention.

FIG. 7 is a block diagram of a processing system 700 in accordance with one embodiment of the present invention. Processing system includes a first processing unit 710, a second processing unit 730 and a memory system 740. Each processing unit includes a load store unit that communicates with the memory system. Specifically, processing unit 710 has a load store unit 720, which includes an instruction decoder 721, a load scheduler 723, a load pipeline 725, a store scheduler 727, and a store pipeline 729. Similarly, processing unit 730 has a load store unit 740, which includes an instruction decoder 741, a load scheduler 743, a load pipeline 745, a store scheduler 747, and a store pipeline 749. As explained above, store instructions issued by any store scheduler in the system should mark the write flags of any skipping load instructions with a matching address tag. Including load instructions issued by other load store units and in other processing units. Thus, store scheduler 727 in load store unit 730 is shown to connect to both load scheduler 723 in load store unit 720 as well as load scheduler 743 in load store unit 740 of processing unit 730. Similarly, store scheduler 747 of load store unit 740 is shown to connect to load scheduler 743 of load store unit 740 and store scheduler 727 of processing unit 710.

Figure 8:
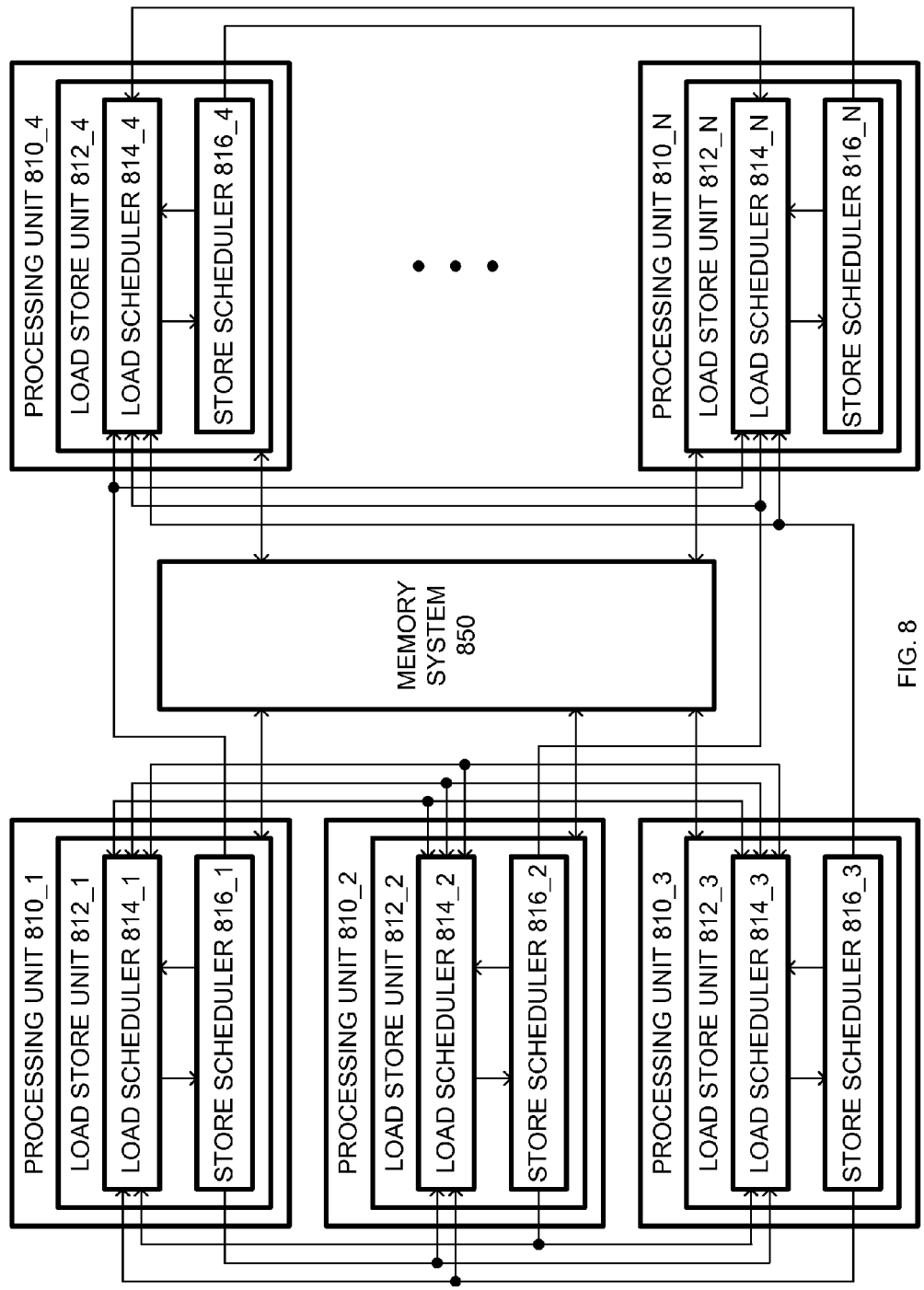
FIG. 8 is a block diagram of a processing system in accordance with one embodiment of the present invention.

The principles of the present invention can be used with systems having any number of processing units. For example, FIG. 8 shows a system 800 having N processing units 810_1, 810_2, 810_3, 810_4 . . . 810_N and a memory system 850 . . . . Each processing unit includes a load store unit (812_1, 812_2, 812_3, 812_4, . . . 812_N) that communicates with the memory system. Each load store unit includes an instruction decoder, a load scheduler, a load pipeline, a store scheduler, and a store pipeline. However, due to space constraints in FIG. 8 only the load scheduler and store scheduler is shown. Specifically, each load store unit 812_X includes a load scheduler 814_X and a store scheduler 816_X. As explained above, store instructions issued by any store scheduler in the system should mark the write flags of any skipping load instructions with a matching address tag. Including load instructions issued by other load store units and in other processing units. Thus, each store scheduler is shown to connect to all of the load schedulers. Specifically, each store scheduler 816_X (where X is 1, 2, 3, 4, . . . N) is shown to connect to load schedulers 814_1, 814_2, 814_3, 814_4, . . . 814_N.

In some embodiments of the present invention, each processing unit includes an internal hazard detection system to detect hazards between store instructions and load instructions in the same processing unit. In these embodiments the system described above is used for detecting hazards for a load instruction issued by a first processing unit caused by a store instruction issued by a second processing unit. However, store instructions that are issued by the first processing unit would not check the skipping load instruction tracking unit of the first processing unit.

Some embodiments of the present invention cancels skipping load instructions that stall in the load pipeline due to a dependency or potential dependency between the skipping load instruction and the store pipeline.

In the various embodiments of the present invention, novel methods and systems have been described for limited issuing of out of order load instructions. By using a max skipping threshold and a max skipped threshold, embodiments of the present invention can detect hazards using a skipping load instruction tracking unit that is less complicated and less resource intensive than conventional load schedulers. The various embodiments of the structures and methods of this invention that are described above are illustrative only of the principles of this invention and are not intended to limit the scope of the invention to the particular embodiments described. For example, in view of this disclosure those skilled in the art can define other load schedulers, primary instruction buffers, fast instruction buffers, FIFOs, instruction issue units, skipping load instruction tracking units, max skipping thresholds, max skipped thresholds, address tags, and so forth, and use these alternative features to create a method, or system according to the principles of this invention. Thus, the invention is limited only by the following claims.

What is claimed is:

1. A method of scheduling a plurality of ordered load instructions from a first processing unit, comprising:
   waiting for a ready load instruction;
   determining whether the ready load instruction is a skipping instruction;
   calculating a number of skipping instructions when the ready load instruction issues;
   stalling the ready load instruction when the number of skipping instructions exceeds a max skipping threshold;
   calculating a number of skipped instructions when the ready load instruction issues;
   stalling the ready load instruction when the number of skipped instructions exceeds a max skipped threshold;
   issuing the ready load instruction when the number of skipping instructions does not exceed the max skipping threshold and the number of skipped instructions does not exceed the max skipped threshold.

2. The method of claim 1, further comprising storing a ready load instruction address tag for the ready load instruction when the ready load instruction is a skipping load instruction.

3. The method of claim 2, wherein the ready load instruction address tag is formed using a physical address of a second oldest load instruction.

4. The method of claim 2, wherein a second oldest load address tag comprises fewer bits than a physical address of a second oldest load instruction.

5. The method of claim 2, wherein the ready load instruction address tag is stored in an entry of a skipping load instruction tracking unit.

6. The method of claim 5, further comprising setting a valid flag in the entry of the skipping load instruction tracking unit.

7. The method of claim 6, further comprising setting a write flag in the entry of the skipping load instruction tracking unit when a first store instruction has a first store instruction address tag that matches the ready load instruction address tag of the ready load instruction.

8. The method of claim 7, wherein the first store instruction is issued by the first processing unit.

9. The method of claim 7, wherein the first store instruction is issued by a second processing unit.

10. The method of claim 9, further comprising setting the write flag in the entry of the skipping load instruction tracking unit when a second store instruction has a second store instruction address tag that matches the ready load instruction address tag of the ready load instruction.

11. The method of claim 10, wherein the second store instruction is issued by a third processing unit.

12. The method of claim 10, wherein the second store instruction is issued by the first processing unit.

13. The method of claim 1, further comprising determining whether the ready load instruction is a skipped load instruction.

14. The method of claim 13, further comprising checking for a hazard with a previously issued skipping load instruction when the ready load instruction is a skipped load instruction.

15. The method of claim 14, wherein the checking for a hazard with a previously issued skipping load instruction when the ready load instruction is a skipped load instruction further comprises:
   comparing a ready load instruction address tag of the ready load instruction with a skipping load instruction address tag of the previously issued skipping load instruction; and
   flushing the previously issued skipping load instruction when the ready load instruction address tag matches the skipping load instruction address tag and a store instruction address tag of a previously issued store instruction.

16. The method of claim 15, wherein the skipping load instruction address tag of the previously issued skipping load instruction is stored in an entry of a skipping load instruction tracking unit.

17. The method of claim 16, further comprising setting a write flag in the entry of the skipping load instruction tracking unit when the store instruction address tag of the previously issued store instruction matches the skipping load instruction address tag of the previously issued skipping load instruction.

18. The method of claim 15, further comprising flushing any skipping load instructions that issued after the previously issued skipping load instruction when the previously issued skipping load instruction is flushed.

19. The method of claim 15, further comprising flushing any instructions dependent on the previously issued skipping load instruction when the previously issued skipping load instruction is flushed.

20. The method of claim 15, further comprising flushing any instructions issued after the previously issued skipping load instruction when the previously issued skipping load instruction is flushed.

21. A system for scheduling a plurality of ordered load instructions from a first processing unit, comprising:
   the first processing unit configured for facilitating performance of operations, comprising:
      waiting for a ready load instruction;
      determining whether the ready load instruction is a skipping instruction;
      calculating a number of skipping instructions when the ready load instruction issues;
      stalling the ready load instruction when the number of skipping instructions exceeds a max skipping threshold;
      calculating a number of skipped instructions when the ready load instruction issues;
      stalling the ready load instruction when the number of skipped instructions exceeds a max skipped threshold;
      issuing the ready load instruction when the number of skipping instructions does not exceed the max skipping threshold and the number of skipped instructions does not exceed the max skipped threshold.

22. The system of claim 21, wherein the operations further comprise storing a ready load instruction address tag for the ready load instruction when the ready load instruction is a skipping load instruction.

23. The system of claim 22, wherein the ready load instruction address tag is formed using a physical address of a second oldest load instruction.

24. The system of claim 22, wherein a second oldest load address tag comprises fewer bits than a physical address of a second oldest load instruction.

25. The system of claim 22, wherein the ready load instruction address tag is stored in an entry of a skipping load instruction tracking unit.

26. The system of claim 25, wherein the operations further comprise setting a valid flag in the entry of the skipping load instruction tracking unit.

27. The system of claim 26, wherein the operations further comprise setting a write flag in the entry of the skipping load instruction tracking unit when a first store instruction has a first store instruction address tag that matches the ready load instruction address tag of the ready load instruction.

28. The system of claim 27, wherein the first store instruction is issued by the first processing unit.

29. The system of claim 27, wherein the first store instruction is issued by a second processing unit.

30. The system of claim 29, wherein the operations further comprise setting the write flag in the entry of the skipping load instruction tracking unit when a second store instruction has a second store instruction address tag that matches the ready load instruction address tag of the ready load instruction.

31. The system of claim 30, wherein the second store instruction is issued by a third processing unit.

32. The system of claim 30, wherein the second store instruction is issued by the first processing unit.

33. The system of claim 21, wherein the operations further comprise determining whether the ready load instruction is a skipped load instruction.

34. The system of claim 33, wherein the operations further comprise checking for a hazard with a previously issued skipping load instruction when the ready load instruction is a skipped load instruction.

35. The system of claim 34, wherein the checking for a hazard with a previously issued skipping load instruction when the ready load instruction is a skipped load instruction further comprises:
- comparing a ready load instruction address tag of the ready load instruction with a skipping load instruction address tag of the previously issued skipping load instruction; and
- flushing the previously issued skipping load instruction when the ready load instruction address tag matches the skipping load instruction address tag and a store instruction address tag of a previously issued store instruction.

36. The system of claim 35, wherein the skipping load instruction address tag of the previously issued skipping load instruction is stored in an entry of a skipping load instruction tracking unit.

37. The system of claim 36, wherein the operations further comprise setting a write flag in the entry of the skipping load instruction tracking unit when the store instruction address tag of the previously issued store instruction matches the skipping load instruction address tag of the previously issued skipping load instruction.

38. The system of claim 35, wherein the operations further comprise flushing any skipping load instructions that issued after the previously issued skipping load instruction when the previously issued skipping load instruction is flushed.

39. The system of claim 35, wherein the operations further comprise flushing any instructions dependent on the previously issued skipping load instruction when the previously issued skipping load instruction is flushed.

40. The system of claim 35, wherein the operations further comprise flushing any instructions issued after the previously issued skipping load instruction when the previously issued skipping load instruction is flushed.

* * * * *